United States Patent [19]
Dreyfuss et al.

[11] Patent Number: 5,244,015
[45] Date of Patent: Sep. 14, 1993

[54] PIPE-END PROTECTOR

[75] Inventors: Wilfried Dreyfuss, Eimke, Fed. Rep. of Germany; Thomas E. Remp, Houston, Tex.; Kurt Müller, Eicklingen, Fed. Rep. of Germany

[73] Assignee: Drilltec Patents & Technologies Co., Houston, Tex.

[21] Appl. No.: 865,712

[22] Filed: Apr. 8, 1992

Related U.S. Application Data

[62] Division of Ser. No. 531,107, May 31, 1990, Pat. No. 5,195,562, which is a division of Ser. No. 212,795, Jun. 29, 1988, Pat. No. 4,957,141.

[30] Foreign Application Priority Data

Jun. 30, 1987 [DE] Fed. Rep. of Germany ....... 3721541

[51] Int. Cl.$^5$ ............................................. F16L 57/00
[52] U.S. Cl. ...................................... 138/96 T; 138/89
[58] Field of Search ....................... 138/89, 96 R, 96 T

[56] References Cited

U.S. PATENT DOCUMENTS

| | | | |
|---|---|---|---|
| 2,022,189 | 11/1935 | Engstrom | 138/96 T |
| 2,204,130 | 6/1940 | Engstrom | 138/96 T |
| 2,316,013 | 4/1943 | Mulholland | 138/96 T |
| 2,543,960 | 3/1951 | Elmer | 138/96 T |
| 4,185,665 | 1/1980 | Flimon | 138/96 T |
| 4,655,256 | 4/1987 | Lasota et al. | 138/96 T |

Primary Examiner—James E. Bryant, III
Attorney, Agent, or Firm—Shlesinger, Arkwright & Garvey

[57] ABSTRACT

A pipe-end protector depending on its being used as a cap or plug comprises a metal housing with a sleeve-like, elastomer inset or a metal plug with a sleeve-like, elastomer cover. To increase the strength of the protector, the metal housing or the metal plug—which always are tubular—are provided at their outer end with a flanged or folded, preferably rolled edge. To facilitate manufacture of the protector, the inset or the cover may consist of at least two part-cylindrical mating case-components.

15 Claims, 5 Drawing Sheets

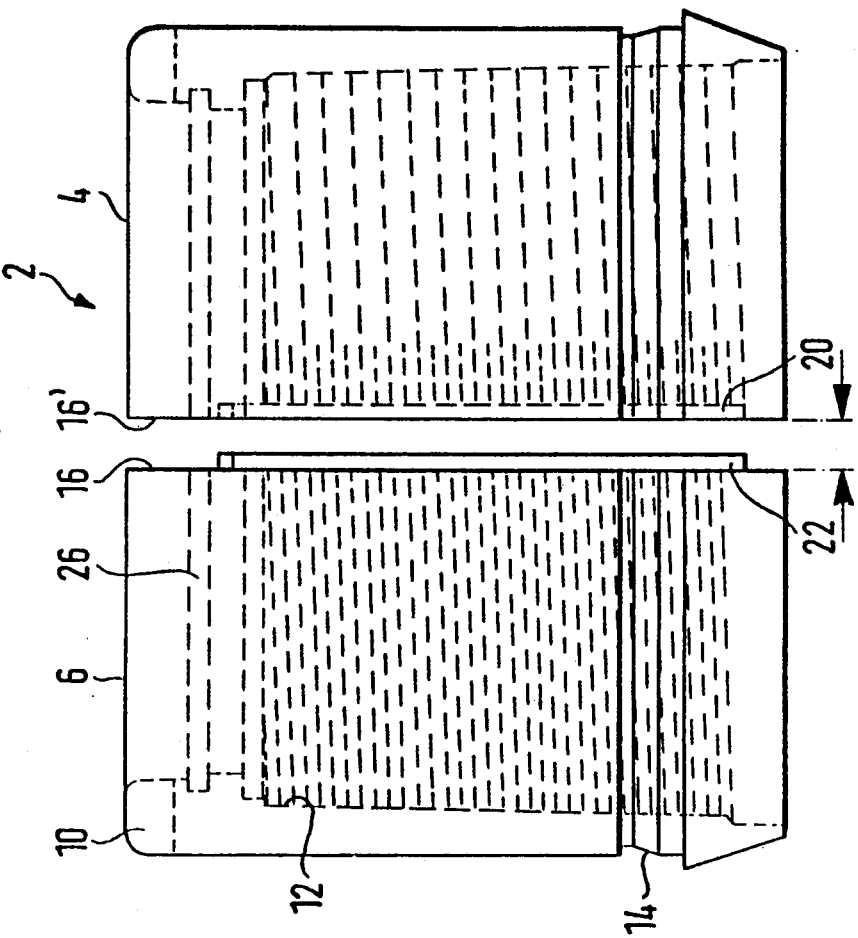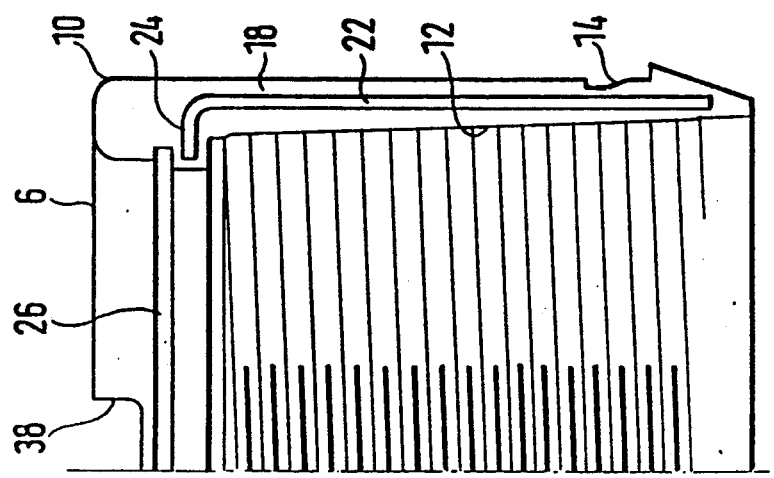

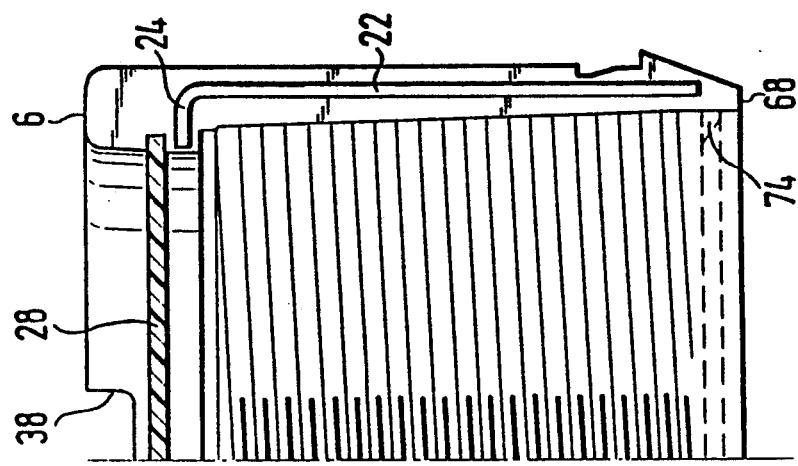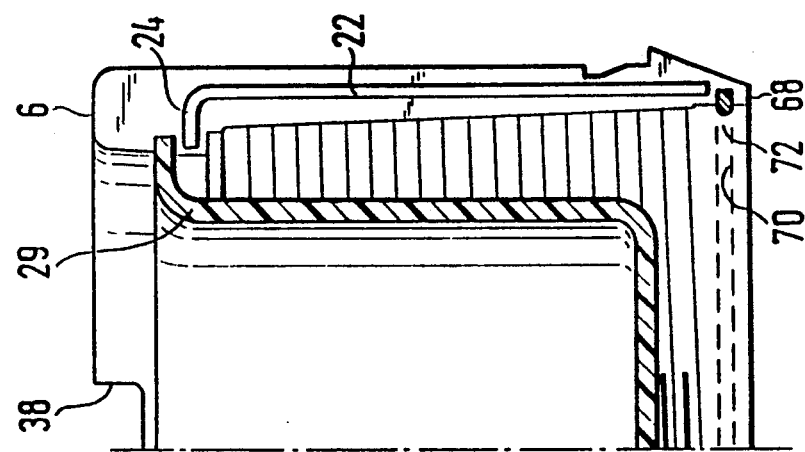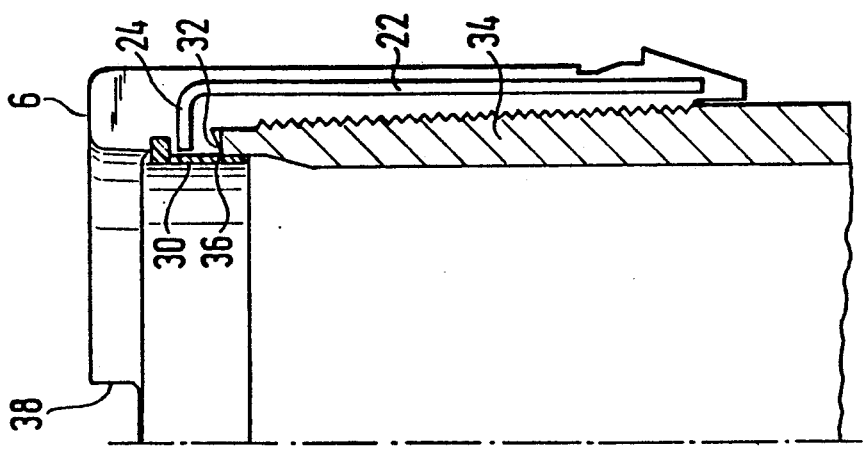

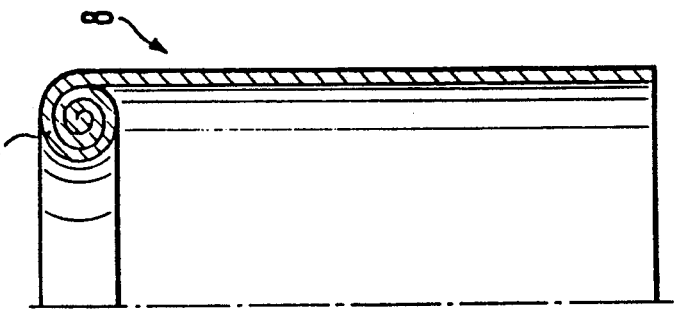
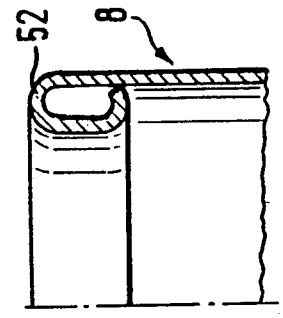
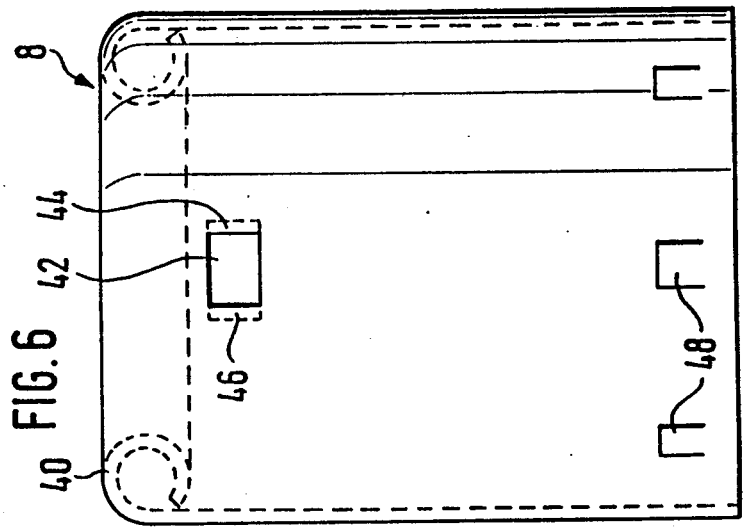
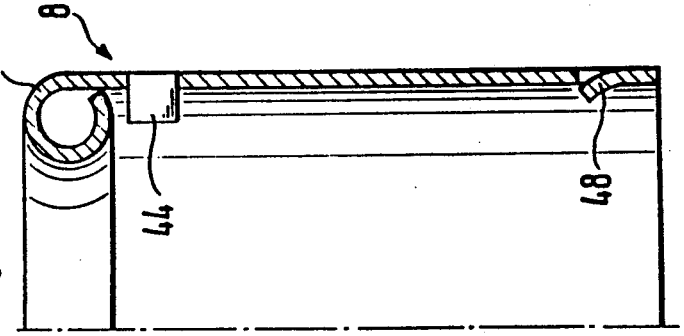

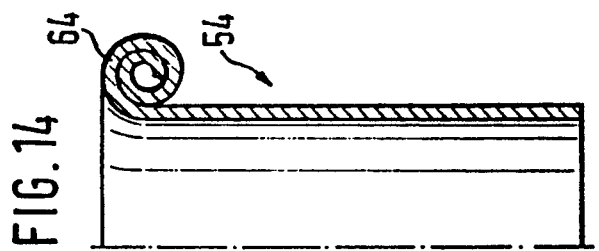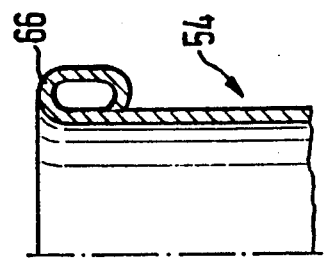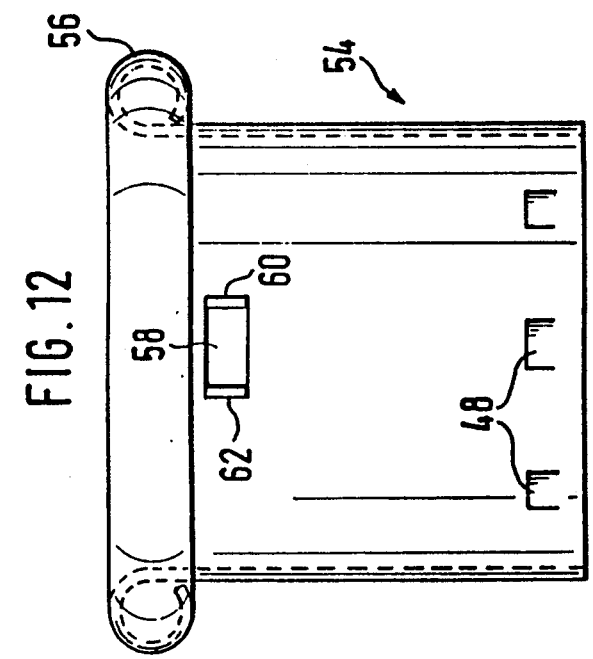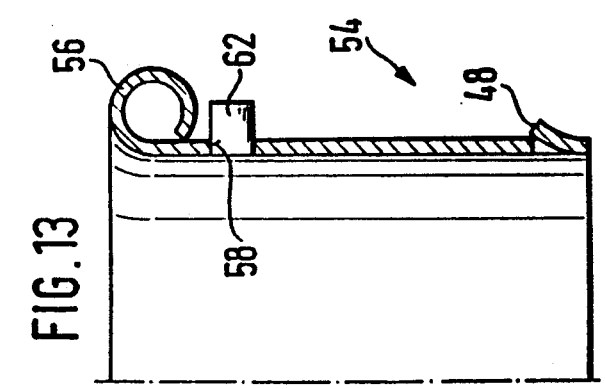

PIPE-END PROTECTOR

This is a division of application Ser. No. 07/531,107 filed May 31, 1990, now U.S. Pat. No. 5,195,562, which is a division of application Ser. No. 07/212,795 filed Jun. 29, 1988, now U.S. Pat. No. 4,957,141.

The invention concerns a pipe-end protector.

Protectors consisting of a metal housing and an integral plastic inset, or of a metal plug and an integral sleeve-like cover have long been known; illustratively see the German patent 2,939,384 and the German Offenlegungsschrift 2,800,747. These devices incur the drawback that insets and covers must be made using comparatively expensive tools or molds where following injection, either the thread core must be turned out or the inset or cover must be screwed off the core. Molds with so-called drop cores are economical only for mass production because of their complex design.

Furthermore, plastic protectors have long been known.

Protectors with integral insets or covers and also protectors made of plastic moreover suffer from the drawback of being hard to disassemble, and even harder to assemble, at low temperatures on account of the contraction of the plastic. As result substantial problems may be encountered when using such protectors for instance for petroleum pipes, which are used at much different temperatures, especially where large-diameter pipes are concerned.

Again protectors are known for which the metal housing of the metal plug is merely bent around at the upper edge to provide the protective cap or plug with greater strength. In many cases, especially with large-diameter pipes or with very heavy pipes, the strength no longer suffices to effectively protect the pipe end and the pipe threads against impacts.

Accordingly the object of the present invention is to so design a protector of the initially cited kind that greater strength is possible. Also, manufacture shall be made easier.

This problem is solved by the present invention wherein a pipe-end protector is provided, which depending on the application, is in the form of a cap or a plug with a metal housing and a sleeve-like elastomer inset or with a metal plug and a sleeve-like elastomer cover, respectively, characterized in that the metal housing or the metal plug are tubular and comprise a flanged or rolled edge at the outer end. The manufacture is substantially eased by the designs of the prevent invention. Advantageous and appropriate further developments are stated in the application.

Protectors of the type disclosed herein are substantially stronger than protectors known heretofore, in particular on account of the flanged, or rolled, or folded edge.

On account of the design disclosed herein the manufacture of the insert or cover is feasible using simple molds which are much more economical to make than those hitherto used in the state of the art. The molds merely need be equipped with ejector pins to eject the injection molding. As a result cooling and fabrication times are substantially reduced.

The metal housing and the metal stopper of the invention are equally advantageously applicable, whether integral or multi-part insets and covers are concerned.

The groove formed in the inset illustratively may be used to insert a bottom in order to turn an open protective cap into a closed one. Separate sealing elements also may be placed into the grooves, as disclosed herein. Instead of such sealing elements, injection-molded thin-walled strips also may be provided as axial sealing rings.

The further development disclosed herein allows passing through accessory tool to assemble and disassemble the protectors. The bent-apart tongues reinforce the application surfaces of the accessory tool and simultaneously act as drivers for the plastic inset because resting against the lateral boundaries of the inset or of the cover.

The further development disclosed herein allows especially good axial fastening of the inset or cover to the metal unit.

The protectors disclosed herein are especially advantageous.

The invention is elucidated below in relation to the attached drawing showing the embodiment modes.

FIG. 1 is a first embodiment of a two-part inset of a protector of the invention.

FIG. 2 is a top view of the two rest surfaces of a half of the inset of FIG. 1.

FIG. 3 is a second embodiment of an inset of the invention.

FIG. 4 is a third embodiment of an inset of the invention.

FIG. 5 is a fourth embodiment.

FIG. 6 is a schematic of a first embodiment of a metal housing of the protector of the invention.

FIG. 7 is an axial section of the metal housing of FIG. 6.

FIG. 8 is a second embodiment of a metal housing.

FIG. 9 is a third embodiment of a metal housing.

FIG. 12 is a first embodiment of a cylindrical metal stopper of a protector of the invention.

FIG. 13 is a section of the metal stopper of FIG. 12.

FIG. 14 is a second embodiment of a metal stopper.

FIG. 15 is a third embodiment of a metal stopper.

Where appropriate, the same reference numerals denote the same components in the drawings.

Figure 11:
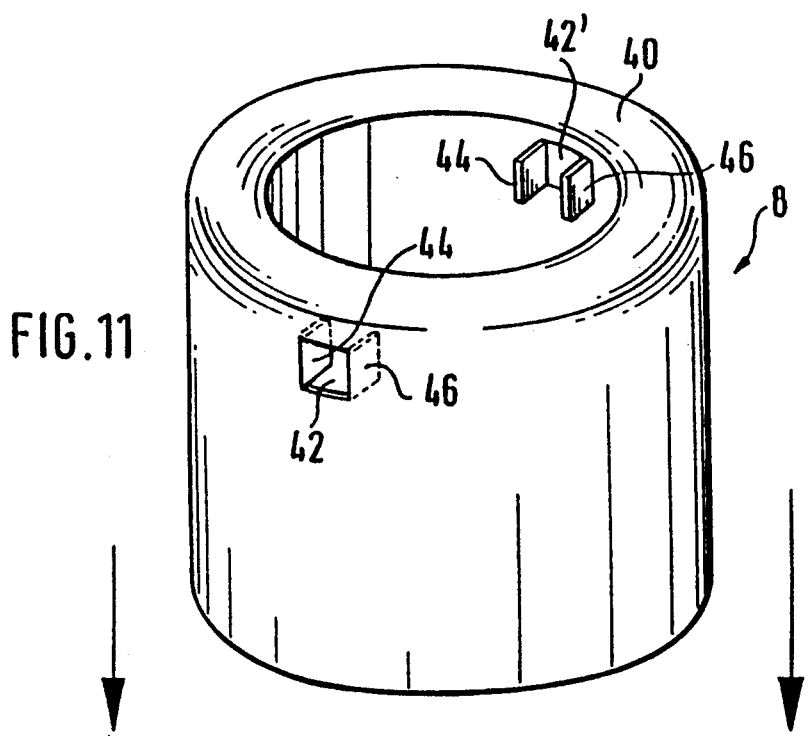
FIG. 11 is perspective of a metal housing which can be slipped over the inset of FIG. 10.

FIGS. 1 through 5 show an inset 2 consisting of two halves 4, 6 for a metal housing 8 of FIGS. 6 through 9 and 11. Each inset half is a half-cylindrical and is thicker at the end side 10. A thread 12 is present on the inside. A circular groove 14 may be provided on the outside.

Each inset half comprises two rest surfaces 16, 18 and 16',18' respectively, only one of which is shown in FIGS. 1 through 5 and denoted by 16 and 16'.

The rest surfaces of one (4) of the inset halves comprise a groove 20 and the rest surfaces of the other inset halves comprise a spring 22 complementary to the groove. However one of the rest surfaces of the inset halves 4 and 6 may comprise a groove and the other rest surface may be provided with a corresponding spring.

Near the reinforced end 10, the spring and the groove evince a radially inward bend or angle 24.

The inset 4 and 6 of FIGS. 1 and 2 furthermore comprise a groove 26 near the reinforced end 10.

In the assembled state of the two inset halves, the groove 26 forms an annular inner groove which illustratively may seat a plastic lid 28 in order to form thereby a protective sealed cap as shown in FIG. 3.

The lid also may be pot-shaped as shown in FIG. 4.

FIG. 5 shows an embodiment where a lip seal 30 is placed into the groove 26, comprising a lip 36 overlapping in sealing manner the sealing gap 32 between a pipe 34 and the inset 2.

Figure 10:
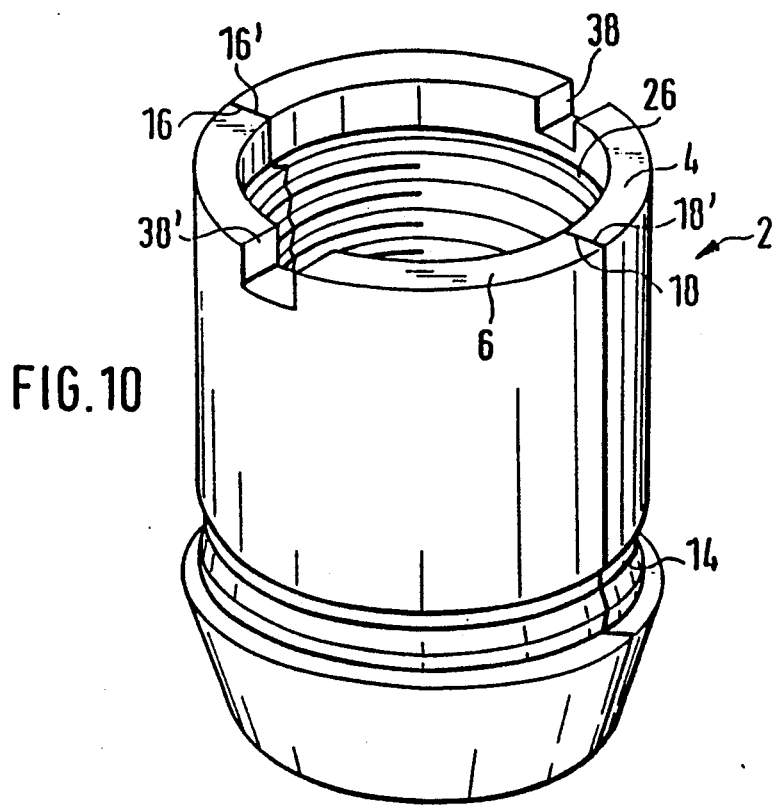
FIG. 10 is a perspective of an inset composed of two halves.

The reinforced part of the top side of the input halves always comprises a rectangular clearance 38, 38′. This is shown especially clearly in FIG. 10 showing the two inset halves 4 and 6 in the assembled state.

The following refers to FIGS. 6 through 9 and 11 showing various embodiments of the metal housing 8. FIG. 6 shows a metal hosing of which the outer top side edge is provided with an inward rolled edge 40. Below the rolled edge the cylindrical metal housing 8 comprises two diametrically opposite apertures 42, 42′ with two lateral, inward bent tabs 44, 46 as shown especially clearly by FIGS. 7 and 11. When the metal housing 8 is slipped on the inset 2 (FIGS. 10 and 11), the tabs 44 and 46 enter the clearances 38, 38′ so that circumferential locking is achieved. A bar-shaped tool can be made to pass through the apertures 42, 42′ and the clearances 38, 38′ when assembling or disassembling the protector.

At its lower part, the metal housing is provided on its circumference with inward pointing tabs 48 entering the circumferential groove 14 of the inset 2 and thereby achieve axial locking.

In the embodiment of FIG. 8 the rolled edge. 50 is a spiral which may fill all of the previous cavity.

FIG. 9 shows a rolled edge of oval cross-section.

FIGS. 12 through 15 show a hollow-cylindrical metal plug 54 provided at its top end with an outward rolled edge 56. The metal plug 54 is enclosed by cover halves omitted from the drawing but quite similar to the inset halves 4 and 6 of FIGS. 1 through 5. The metal plug 54 comprises two diametrically opposite apertures 58 with lateral, outward pointing tabs 60, 62, see FIG. 13. These tabs 60, 62 enter, quite similarly to the case of the metal hosing 8, corresponding clearances in the omitted cover.

FIGS. 14 and 15 show two further embodiment modes of the metal plug the rolled edge of the embodiment of FIG. 14 assuming the shape of a spiral 64 and the embodiment of FIG. 15 that of an oval 66.

In order to also seal the protector at the end opposite the top side, i.e. at the end where the thread 68 begins, relative to the pipe 34, the inset 2 of a protective cap may comprise at the inside of that end a peripheral groove for an O-ring 72 indicated in dashed lines for the inset half 6 in FIG. 4, or it may comprise at the inside of this end 68 a peripheral integrated, bevelled seal 74 as indicated in dashed lines in FIGS. 3 for the inset half 6.

In quite similar manner, the cover of a protective plug may be provided on the outside with a groove for an O-ring or with an integrated peripheral sealing ledge (omitted from the drawing).

We claim:

1. A protector for the threads of a pipe-end, comprising:
   a) a longitudinally extending tubular member;
   b) an elastomeric sleeve adapted to engage the threads of a pipe-end and affixed co-axially and co-extensively relative to said tubular member, thereby forming a unit;
   c) said sleeve including at least first and second halves;
   d) means for securing said sleeve to said tubular member;
   e) said unit having first and second spaced end portions;
   f) said unit first end portion including an annular groove; and
   g) an elastic lid removably secured to said annular groove.

2. A protector as in claim 1, wherein:
   a) said first and second halves include first and second pairs of mating surfaces; and
   b) each pair of said mating surfaces includes a ridge disposed on one mating surface and a cooperating groove disposed on the other mating surface.

3. A protector as in claim 2, wherein:
   a) said sleeve includes first and second end portions;
   b) said first end portion is thicker than said second end portion; and
   c) each of said ridge includes a curved portion disposed in said thicker first end portion of said sleeve.

4. A protector as in claim 1, wherein:
   a) said sleeve includes a second end portion adjacent said unit second end portion;
   b) said sleeve includes an annular groove adjacent said second end portion; and
   c) said tubular member includes projecting tabs adapted to engage said sleeve annular groove when said tubular member and said sleeve are assembled as a unit.

5. A protector as in claim 1, wherein:
   a) said sleeve includes a first edge portion adjacent said unit first end portion;
   b) said sleeve first edge portion includes at least a depression; and
   c) said tubular member includes at least a projecting tab adapted to engage said depression when said tubular member and said sleeve are assembled as a unit.

6. A protector as in claim 1, wherein:
   a) said unit second end portion includes an annular seal disposed between said unit and the pipe-end.

7. A protector as in claim 6, wherein:
   a) said seal is integral with said sleeve.

8. A protector as in claim 6, wherein:
   a) said sleeve includes an annular groove; and
   b) said seal is disposed in said annular groove.

9. A protector as in claim 1, wherein:
   a) said sleeve is disposed within said tubular member; and
   b) said tubular member includes a first end portion curved inwardly.

10. A protector as in claim 1, wherein:
    a) said sleeve is disposed outside said tubular member; and
    b) said tubular member includes a first end portion curved outwardly.

11. A protector as in claim 9, wherein:
    a) said tubular member includes an edge section extending transversely thereto and engaging an end portion of said sleeve.

12. A protector as in claim 11, wherein:
    a) said sleeve includes a radially extending annular flange adjacent said tubular member first edge section for engaging an end portion of the pipe-end.

13. A protector as in claim 10, wherein:
    a) said sleeve includes a radially extending annular flange adjacent said tubular member edge section for engaging an end portion of the pipe-end.

14. A protector as in claim 9, wherein:
    a) said tubular member first end portion is bent into a spiral.

15. A protector as in claim 10, wherein:
    a) said tubular member first end portion is bent into a spiral.

* * * * *